United States Patent [19]

Kitamura et al.

[11] 4,239,152
[45] Dec. 16, 1980

[54] TEMPERATURE RESPONSIVE VALVE ASSEMBLY

[75] Inventors: Kazuhiko Kitamura; Atsushi Satomoto, both of Tokyo, Japan

[73] Assignee: Aisin Seiki Kabushiki Kaisha, Kariya, Japan

[21] Appl. No.: 87,185

[22] Filed: Oct. 22, 1979

Related U.S. Application Data

[63] Continuation of Ser. No. 620,680, Oct. 8, 1975, abandoned.

[30] Foreign Application Priority Data

Oct. 29, 1974 [JP] Japan .................................. 49-53509
May 5, 1975 [JP] Japan ................................ 50-124645

[51] Int. Cl.³ .......................................... G05D 23/10
[52] U.S. Cl. .................................... 236/48 R; 236/87; 236/101 C
[58] Field of Search ................. 236/101 R, 101 C, 87, 236/43, 48 R; 251/75; 165/39; 137/468

[56] References Cited

U.S. PATENT DOCUMENTS

| | | | |
|---|---|---|---|
| 2,078,108 | 4/1937 | Torrey | 62/223 |
| 2,613,874 | 10/1952 | Thomas | 236/48 R |
| 3,542,289 | 11/1970 | Ojala et al. | 236/48 R |
| 3,687,920 | 8/1972 | Myers | 137/468 X |
| 3,799,432 | 3/1974 | Schneider | 236/48 R |
| 3,853,268 | 12/1974 | Schneider | 236/48 R |
| 3,930,613 | 1/1976 | Place | 236/48 R |
| 3,963,042 | 6/1976 | Bible | 137/468 |

Primary Examiner—Albert J. Makay
Assistant Examiner—William E. Tapolcai, Jr.
Attorney, Agent, or Firm—Sughrue, Rothwell, Mion, Zinn and Macpeak

[57] ABSTRACT

A temperature responsive valve assembly comprises a valve for controlling the fluid communication between fluid inlet and outlet passages containing therein a fluid to be controlled, a valve operating member operatively connected to the valve for operating the same in response to the temperature of a control fluid for controlling the valve assembly. The valve operating member is thermally separated from the fluid in the inlet and outlet passages so that it may sense only the temperature of the control fluid for controlling the valve assembly and the fluid to be controlled.

2 Claims, 2 Drawing Figures

4,239,152

TEMPERATURE RESPONSIVE VALVE ASSEMBLY

This is a Continuation of application Ser. No. 620,680, filed Oct. 8, 1975, now abandoned.

BACKGROUND OF THE INVENTION

1. Field of the Invention

This invention relates generally to temperature responsive valves and more particularly to a temperature responsive valve for controlling fluid flow including a bimetallic disc which is operable in response to the temperature of a separate controlling fluid surrounding the valve.

2. Prior Art Description

In the prior art, such as, for example, in U.S. Pat. No. 3,687,290, granted Aug. 29, 1972, there is disclosed a temperature responsive valve construction wherein fluid communication between inlet and outlet ports 17, 18 is controlled by a bimetallic disc 24 which operates in response to the sensed temperature of a fluid in direct contact with the disc.

This type of the valve construction, however, has a serious drawback since the bimetallic valve is disposed within a chamber 16 (FIGS. 2 and 3 thereof) through which the fluid to be controlled passes. Therefore, the bimetallic valve senses the temperature of the fluid in the chamber 16 instead of the temperature of an external controlling fluid surrounding the outer periphery of the cover member 15.

SUMMARY OF THE INVENTION

According to the present invention, therefore, there is provided a bimetallic disc substantially separated from the fluid passages so that the bimetallic disc will sense only the temperature of the external controlling fluid and will not be influenced by the temperature of the fluid to be controlled.

It is, therefore, an object of the invention to provide an improved temperature responsive valve with a bimetallic disc.

The foregoing and other objects, features and advantages of the invention will be apparent from the following more particular description of preferred embodiments of the invention as illustrated in the accompanying drawings.

DETAILED DESCRIPTION OF THE PREFERRED EMBODIMENT

Figure 1:
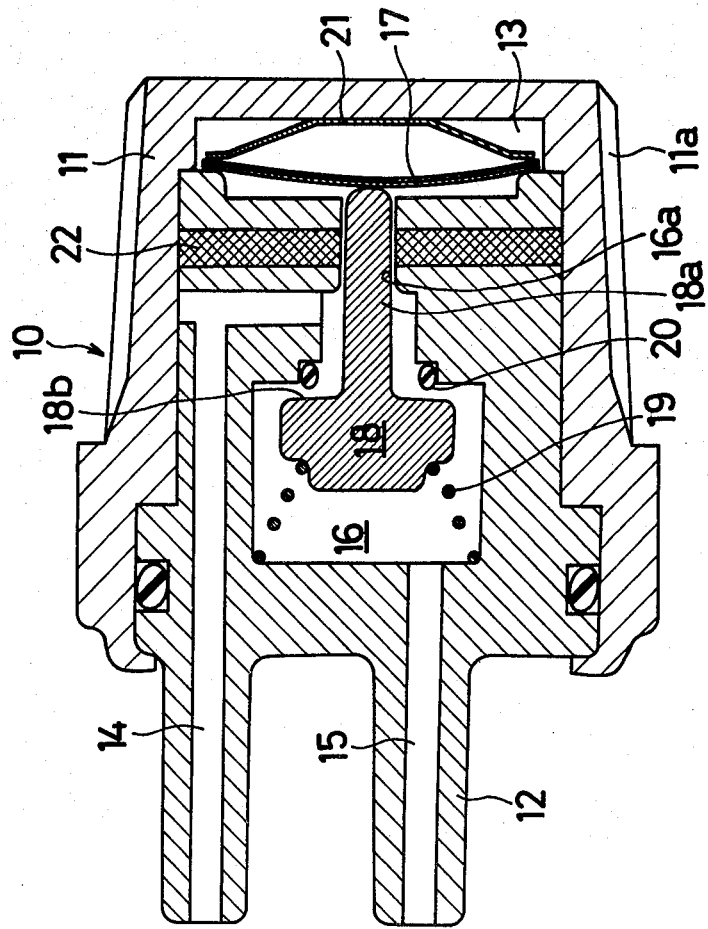
FIG. 1 is a cross-sectional view of the temperature responsive valve assembly of the present invention.

First Embodiment (FIG. 1)

A temperature responsive valve assembly generally designated by numeral 10 comprises a cup-shaped housing 11 made of a heat-conductive material, for example a brass metal, having an open end and a closed end, and a valve body 12 sealingly secured in the housing 11 to define a chamber 13 therebetween. The open end of the housing 11 (left side as viewed in FIG. 1) is closed by the valve body 12. The housing 11 is provided with a screw portion 11a at its outer periphery for being threaded into, for example, a water jacket (not shown) of an engine of a vehicle in order to sense the change of the fluid temperature therein.

The valve body 12 comprises therein inlet and outlet fluid passages 14 and 15 and a stepped central bore 16 therebetween in fluid communication with the two passages 14, 15. The stepped central bore 16 is formed with a guide-passage 16a leading to the chamber 13 for guiding the sliding movement of a stem 18a of a valve member 18 reciprocably disposed within the central bore 16 of the valve body 12. The valve member 18 is normally biased toward the right in the direction of the chamber 13 by a spring 19 also disposed within the central bore 16. The stem 18a of the valve member 18 extends through the guide-passage 16a of the bore 16 and into the chamber 13.

A valve seat member 20 is disposed in the central bore 16 between the inlet and outlet passages 14, 15 and is engageable with a shoulder 18b of the valve member 18 upon reciprocable movement thereof for interrupting the fluid communication between the inlet and outlet passages 14, 15.

A bimetallic snap disc 17 is disposed within the chamber 13 and supported at its outer extremity by a spring 21 secured to the inside wall of the closed end of the housing 11. The bimetallic snap disc 17 has a bowed configuration presenting convex and concave surfaces and is arranged such that when it senses that the temperature of the water surrounding the housing 11 (e.g., the fluid temperature in the water jacket) is below a predetermined value, the convex surface of the bimetallic snap disc 17 will be in contact with the end of the stem 18a of the valve member 18 to separate the shoulder 18b thereof from the valve seat member 20 overcoming the biasing force of the spring 19 thereby allowing fluid communication between the inlet and outlet passages 14 and 15 (the status in FIG. 1).

However, when the bimetallic snap disc 17 senses a temperature of the surrounding fluid above the predetermined value, then it snaps over center so that in its snapped condition the concave side of the bimetallic disc 17 is spaced from the end of the stem 18a of the valve member 18. Therefore, the valve member 18 is moved to the right in FIG. 1 by the biasing force of the spring 19 to engage the shoulder 18b with the valve seat 20 thereby interrupting the fluid communication between the inlet and outlet passages 14 and 15.

It should be noted that the guide-passage 16a of the central bore 16 provides only minimal clearance for guiding the sliding movement of the stem 18a of the valve member 18 so that the fluid flow therethrough into the chamber 13 from the central bore 16 may be such an extremely minimum value that the temperature of the fluid in the bore 16 will not unduly influence the operation of the bimetallic snap disc 17.

It should also be noted that in order to prevent the fluid temperature in the inlet and outlet passages 14 and 15, as well as in the central bore 16, from unduly influencing the bimetallic snap disc 17, the valve body 12 and the valve member 18 may be made of a non-heat-conductive material such as for example a resin or the like. A disc of non-heat-conductive material such as asbestos 22 may be disposed within the valve body 12 between the chamber 13 and the central bore 16 to shield the bimetallic disc 17 from the temperature of the fluid within the central bore 16.

Thus, since the bimetallic snap disc 17 may be for all practical purposes separated from the fluid passages 14 and 15 and the bore 16, the temperature sensing of the bimetallic snap disc may be performed only under the influence of the temperature of the fluid to be sensed externally of the housing 11. Thus, even when the fluid to be controlled has a considerable high temperature, the operation of this valve assembly will still have a high degree of reliability.

Figure 2:
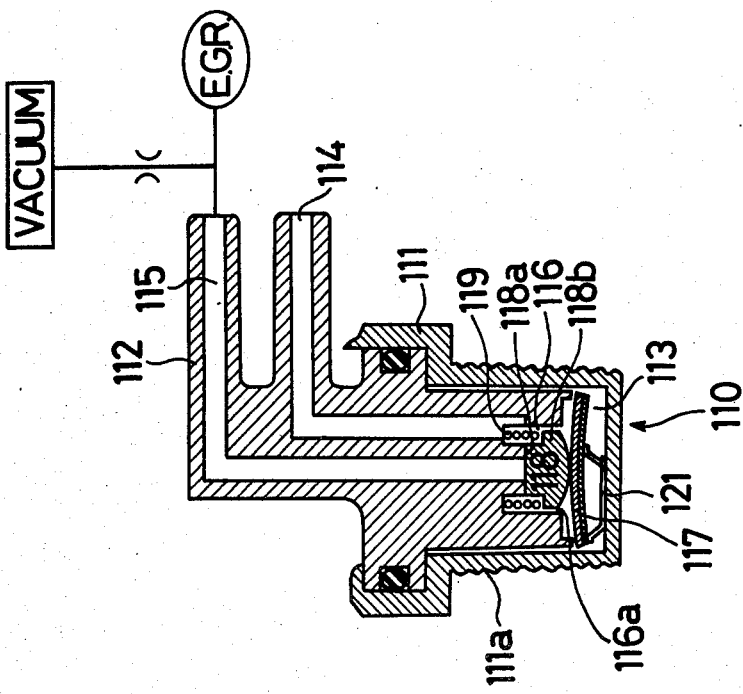
FIG. 2 is a similar view to FIG. 1 but showing another embodiment of the present invention.

Second Embodiment (FIG. 2)

A temperature responsive valve generally designated by numeral 110 is constructed similar to that of the first embodiment, and therefore, only the difference therebetween will be explained hereinafter.

The valve body 112 includes an inlet passage 114, an outlet passage 115, and a bore 116 provided therebetween. The bore 116 is at its lower end open to a chamber 113 in which is disposed a bimetallic snap disc 117.

A valve member 118 is reciprocably disposed within the bore 116 for controlling the fluid communication between the inlet and outlet passages.

In this embodiment, the outlet passage 115 is normally closed by one end 118a of the valve member 118 and upon reciprocable movement of the valve body 118 the inlet and outlet passages may be communicated with each other. The other end 118b of the valve member 118 has a diameter substantially equal to that of the bore 116 so that the fluid in the inlet and outlet passages will not flow into the chamber 113. The end 118a of the valve member 118, of course, has a diameter sufficiently large for closing the opening of passage 115.

The bimetallic snap disc 117 is in a bowed configuration as in the previous embodiment and is arranged such that when it senses a temperature in the surrounding fluid in the water jacket below a predetermined value, the convex surface thereof is in contact with the lower end 118b of the valve member 118 to push the same upwardly overcoming the biasing force of the spring 119. Thus, the outlet passage 115 is closed by the upper end 118a of the valve member 118 to interrupt fluid communication between the inlet and outlet passages 114, 115 (the condition of FIG. 2).

However, when the bimetallic snap disc 117 senses the temperature of the surrounding water above the predetermined value, the disc snaps over center so that the concave side of the disc 117 will be spaced from the lower end 118b of the valve member 118 permitting separation of the upper end 118a from the outlet passage 115 by the biasing force of the spring 119. This permits fluid communication between the inlet and outlet passages.

The valve body 118 as well as the plug body 112 may preferably be made of a non-heat-conductive material such as a resin or the like. The casing 111 is made of a heat-conductive material, for example, a brass steel.

It should be noted that an annular gap 116a between the inside wall of the bore 116 and the lower end 118b of the valve member 118 is provided only for allowing reciprocating movement of the valve member 118, and therefore, the fluid flow from the inlet and outlet passages into the chamber 113 will be so minimum that it can be neglected.

With respect to this second embodiment, an application of this temperature responsive valve assembly may be explained as follows.

The screw portion 111a of the housing 111 is threaded into the water jacket of an engine of a vehicle and accordingly, the bimetallic snap disc 117 senses the temperature of engine coolant (which is the controlling fluid).

The inlet passage 114 is supplied with air (atmospheric pressure) while the outlet passage 115 is connected to a vacuum source (engine intake manifold) and also to an actuator (for example, E.G.R. system, i.e., exhaust gas recirculation system). The vacuum and air are in this case controlled by valve assembly 110 for actuating the E.G.R. system in response to the temperature of the engine coolant.

An E.G.R. system is utilized for controlling the nitrogen oxide content ($NO_x$) of exhaust gases from automobiles by recirculating the exhaust gases with increased $NO_x$ according to the increase of the engine speed.

What is claimed is:

1. A temperature responsive valve assembly comprising a cup-shaped housing of heat conductive material adapted to be disposed within a fluid the temperature of which is to be sensed for controlling the valve assembly and a valve body of non-heat conductive material secured in said housing means with one end thereof spaced from the bottom of said cup-shaped housing to define a chamber, a bore located in said one end of said valve body, passage means in said valve body including first and second fluid passages adapted to contain a fluid to be controlled by the valve assembly, said first and second passages each opening into the bottom of said bore with a flat valve seat surrounding one of said passages, a valve member slidably disposed within said bore in said valve body, said valve member having a flat surface engagable with said flat valve seat, a bimetallic snap disc member disposed in said chamber with the center thereof in engagement with said valve member, first spring means disposed in said chamber between the bottom of said cup-shaped housing and said bimetallic snap disc member, second spring means in said bore between the bottom of said bore and said valve member, said first and second spring means maintaining said bimetallic snap disc member and said valve member in operative engagement with each other and a gap provided between the inner surface of said bore and the outer periphery of said valve member to facilitate the reciprocation of said valve member within said bore, said gap being as small as possible so that the fluid flow from said fluid passages into said chamber will be so minimum that it can be neglected.

2. A temperature responsive valve assembly as set forth in claim 1, wherein said valve member is made of non-heat conductive material to prevent the temperature of the fluid in said first and second passages from influencing the bimetallic snap disc member.

* * * * *